Nov. 21, 1950    R. R. SMITH    2,530,667
METHOD OF CONSTRUCTING HIGH CHAIR TRAYS
Filed July 7, 1945
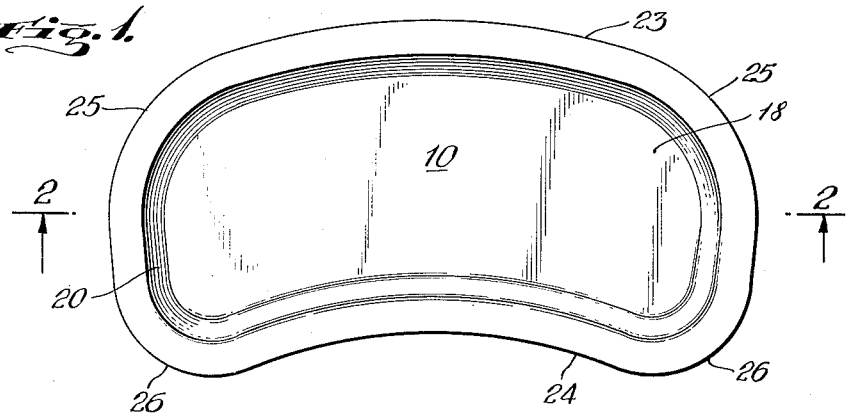
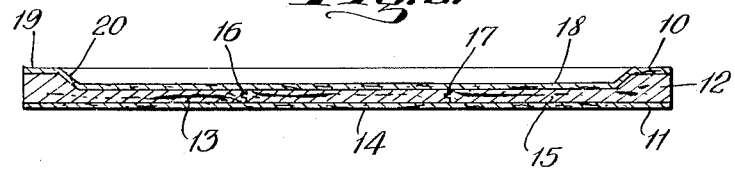
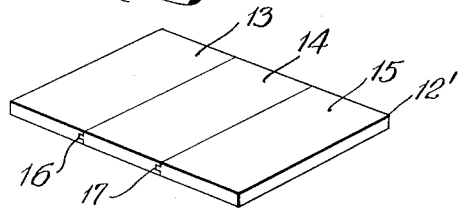
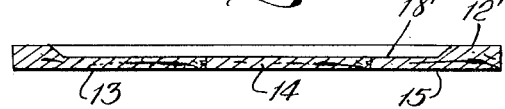
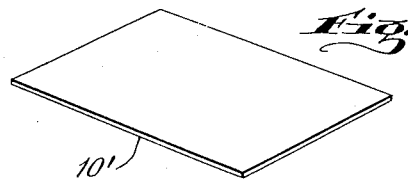
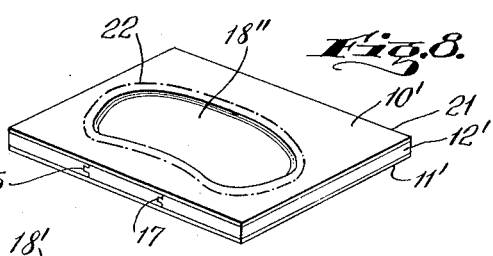
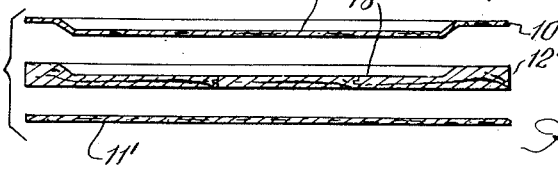
INVENTOR
ROGER R. SMITH
BY
Howard E. Thompson
ATTORNEY Patented Nov. 21, 1950

2,530,667

UNITED STATES PATENT OFFICE 2,530,667

METHOD OF CONSTRUCTING HIGH CHAIR TRAYS

Roger R. Smith, Gardner, Mass.

Application July 7, 1945, Serial No. 603,708

2 Claims. (Cl. 144—309)

1

This invention relates to the trays of high chairs. More particularly, the invention deals with trays of this type and kind constructed of upper and lower facing sheets or veneers, between which is disposed a filler sheet or member, the latter being preferably composed of a plurality of strips of wood glued together at tongue and groove joints. Still more particularly, the invention deals with a novel method of producing trays of the kind under consideration wherein the filler member and the upper facing sheet are fashioned to form a depression inwardly of the peripheral boundaries of the tray, as more fully hereinafter set forth. The novel features of the invention will be best understood from the following description when taken together with the accompanying drawing in which certain embodiments of the invention are disclosed, and in which the separate parts are designated by suitable reference characters in each of the views, and in which:

Fig. 1 is a plan view of a tray made according to my invention.

Fig. 2 is a section on the line 2—2 of Fig. 1.

Fig. 3 is a perspective view of assembled filler strips which I employ.

Fig. 4 is a sectional view showing the step of forming the filler strips.

Fig. 5 is a perspective view of a facing veneer employed in forming the top of the tray.

Fig. 6 is a sectional view through the formed veneer of Fig. 5.

Fig. 7 is an exploded sectional view showing the three parts of the tray in superimposed relationship; and Fig. 8 is a perspective view of the assemblage of the tray parts prior to forming the final peripheral contour of the tray.

In Figs. 1 and 2 of the drawing, I have shown a tray made according to my improved method, the tray comprising, as seen in Fig. 2, an upper facing sheet 10, a lower facing sheet 11, and an intermediate body 12, the latter being composed of a plurality of strips of wood 13, 14 and 15, having tongue and groove joints 16 and 17, glued together. The body 12, as well as the upper facing sheet 10, is so shaped as to form the large depression 18 having a bordering wall 19 joining the depression 18 in an inclined or bevelled surface 20. The tray as disclosed in Figs. 1 and 2, is made in accordance with the method which is now more specifically described.

In Fig. 3 is shown one step in the method which comprises gluing together the wood strips 13, 14

2 and 15 at the tongue and groove couplings 16 and 17, in forming the filler strip 12'.

After the strips 13, 14 and 15 have been secured together, these strips are then saturated in a resinous solution or the same may be steamed in a retort and then the softened strips are placed in a suitable press to form the depression 18' therein, as seen in Fig. 4 of the drawing.

I next take a strip of veneer, such for example, as the strip 10' of Fig. 5, and process this strip the same as I process the strips 13, 14 and 15. The strip is then placed in a press and shaped to form the depression 18'' therein, of such size and shape as to fit within the depression 18' of the strips 13, 14 and 15, which strips may be designated as the filler strips.

Having formed the two products shown in Figs. 4 and 6, these products are then disposed in superimposed relationship to each other, as seen in Fig. 7, with a supplemental veneer strip 11' arranged upon the lower surface of the filler strips, as illustrated in the exploded view of Fig. 7 of the drawing. Glue is applied to adjacent surfaces of the various strips shown in Fig. 7, and these strips are then all glued together by placing the same in a press, applying both heat and pressure, producing a result substantially similar to that shown in the glued workpiece 21 of Fig. 8 of the drawing. This workpiece is then cut in any desired manner along the dot and dash lines 22, which gives the contour of the final tray, as most clearly shown in Fig. 1 of the drawing. One side of the tray, the outer side 23, is convex in form whereas the inner side 24 is concave in form. The tray also has rounded outer corners 25 and rounded inner corners 26. The bevelled wall 20 conforms to the peripheral contour of the tray, as will clearly appear from a consideration of Fig. 1 of the drawing.

From the foregoing, it will be apparent that the filler or body member 12 of the tray has the separate strips arranged in such manner as to extend crosswise of the tray. In other words, the tongue and groove joints of the separate strips extend between the front and rear curved edges of the tray. These strips give strength and rigidity to the tray structure and with the veneer facing sheets, will produce a tray which will maintain its shape and withstand the stresses and strains to which trays of this type and kind are subjected.

In defining the facings 10 and 11 as veneers, it will be apparent that materials of various types and kinds can be used. In some instances, these veneers will be composed of wood, particularly of a texture to withstand service of the tray, and this is especially true of the veneer on the upper face. However, in some instances, the veneers may be composed of other material, such for example, as plastics, in which event, the blank sheet as at 10' will be subjected to heat rather than moisture, sufficient to soften the particular plastics used to enable the same to be formed between suitable dies in a press to the contour shown in Fig. 6 of the drawing and when chilled, the veneer will maintain the tray shape of Fig. 6. With this type of construction, suitable adhesives will be used to establish the bond between the filler or body portion and the upper form sheet or veneer.

It will also be apparent that suitable finishings can be employed on the peripheral edges of the tray to give design and contour thereto.

In connection with the method heretofore described, it will be apparent that after shaping the filler or body member, which may also be referred to as a core, this member is allowed to dry or season to prevent warping.

It will, of course, be apparent that while reference has been made to the construction of trays or table portions for use on high chairs, the same method may be used for producing trays, generally speaking, or table tops wherein it is desirable to employ a depressed area or a recessed surface therein, thus materially simplifying the cost of producing the resulting product, while at the same time, producing a product which will have greater strength and durability than a product made from a single body of wood carved or otherwise formed in conventional manners to the desired form.

It will be understood that my present method dispenses with the need of the application of fine finishes to the upper and lower surfaces, as these finishes can be prepared in the veneer employed, or may constitute the characteristics of the veneer, particularly when plastic veneers are employed. In some instances, it may be desirable to buff and polish at least the upper surface and outer edges of the product and to apply coatings thereto, such as lacquers, varnishes, paints and similar coating materials.

In some instances, it may be desirable to first form the core or filler member with the depression or recess therein, and then in using such materials as plastic sheets, the sheet may be preheated to soften the same and then applied and secured to the core in a single operation, wherein applied heat and pressure will shape the racing sheet to fit the recess or depression in the core, and at the same time, drying the adhesive agent employed.

It will also be apparent that the bevelled surfaces or wall portions bordering the tray depression, while being sufficient to retain articles against displacement, also facilitates cleaning of the tray and dispenses with the customary abrupt grooves employed on trays which are difficult to clean. The rounded corner portions of the tray are also advantageous in this respect.

Having fully described my invention, what I claim as new and desire to secure by Letters Patent is:

1. The method of forming tray-like members, which comprises first securing a plurality of tongue and groove interfitting wood strips of similar width and length together in edge to edge relationship to form a core member, then treating the core member to soften the strips thereof, then pressure shaping the core member to form a recess on one surface thereof within boundary edges of the core member and of predetermined contour, then softening a veneer and pressure shaping the same to form a depressed portion therein within boundary edges thereof and conforming in contour with and adapted to seat snugly in the recess of the core member, drying the veneer and core member, then adhering the veneer and core member together under applied heat and pressure, and then trimming the resulting product outwardly of and paralleling the contour of the recess in one surface thereof in producing the final tray member.

2. The method of forming tray-like members, which comprises first securing a plurality of tongue and groove interfitting wood strips of similar width and length together in edge to edge relationship to form a core member, then treating the core member to soften the strips thereof, then pressure shaping the core member to form a recess on one surface thereof within boundary edges of the core member and of predetermined contour, then softening a veneer and pressure shaping the same to form a depressed portion therein within boundary edges thereof and conforming in contour with and adapted to seat snugly in the recess of the core member, drying the veneer and core member, then placing said veneer on the recess surface of the core member, applying another veneer to the opposed surface of the core member, then adhering said veneer and core member together under applied heat and pressure, and then trimming the resulting product outwardly of and paralleling the contour of the recess in one surface thereof in producing the final tray member.

ROGER R. SMITH.

REFERENCES CITED

The following references are of record in the file of this patent:

UNITED STATES PATENTS

| Number | Name | Date |
| --- | --- | --- |
| 754,067 | Hough | Mar. 8, 1904 |
| 848,690 | Romunder | Apr. 2, 1907 |
| 1,019,408 | Baekeland et al. | Mar. 5, 1912 |
| 1,057,927 | Breece | Apr. 1, 1913 |
| 1,229,806 | Stober | June 12, 1917 |
| 1,270,029 | Heule et al. | June 18, 1918 |
| 1,297,115 | Dulac | Mar. 11, 1919 |
| 1,427,812 | Hirt | Sept. 5, 1922 |
| 1,809,153 | Barrett | June 9, 1931 |
| 1,826,618 | Landaw | Oct. 6, 1931 |
| 1,863,800 | Loetscher | June 21, 1932 |
| 1,867,575 | Loetscher | July 19, 1932 |
| 1,912,931 | Clay | June 6, 1933 |
| 2,118,509 | Heinritz | May 24, 1938 |
| 2,231,345 | Potchen | Feb. 11, 1941 |
| 2,277,590 | Howard | Mar. 24, 1942 |
| 2,382,004 | Curran | Aug. 14, 1945 |

FOREIGN PATENTS

| Number | Country | Date |
| --- | --- | --- |
| 282,338 | Great Britain | Jan. 5, 1928 |